April 27, 1954   J. N. GLADDEN   2,676,465
HYDRAULIC BOOSTER WITH FLOATING MOUNTING
Filed June 24, 1950   2 Sheets-Sheet 1

INVENTOR:
JOHN N. GLADDEN
BY HIS ATTORNEYS
HARRIS, KIECH, FOSTER & HARRIS

April 27, 1954   J. N. GLADDEN   2,676,465
HYDRAULIC BOOSTER WITH FLOATING MOUNTING
Filed June 24, 1950   2 Sheets-Sheet 2
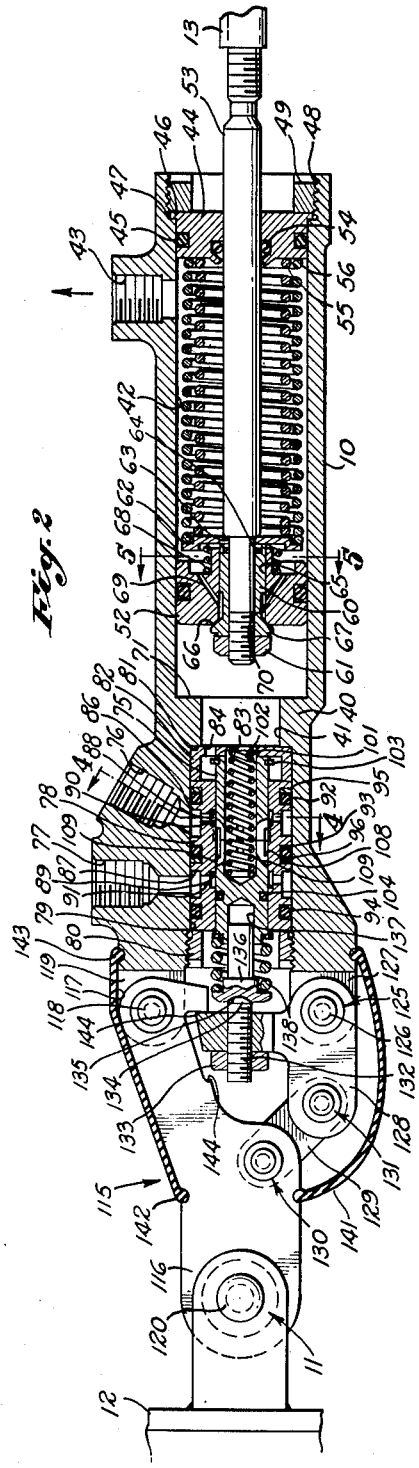
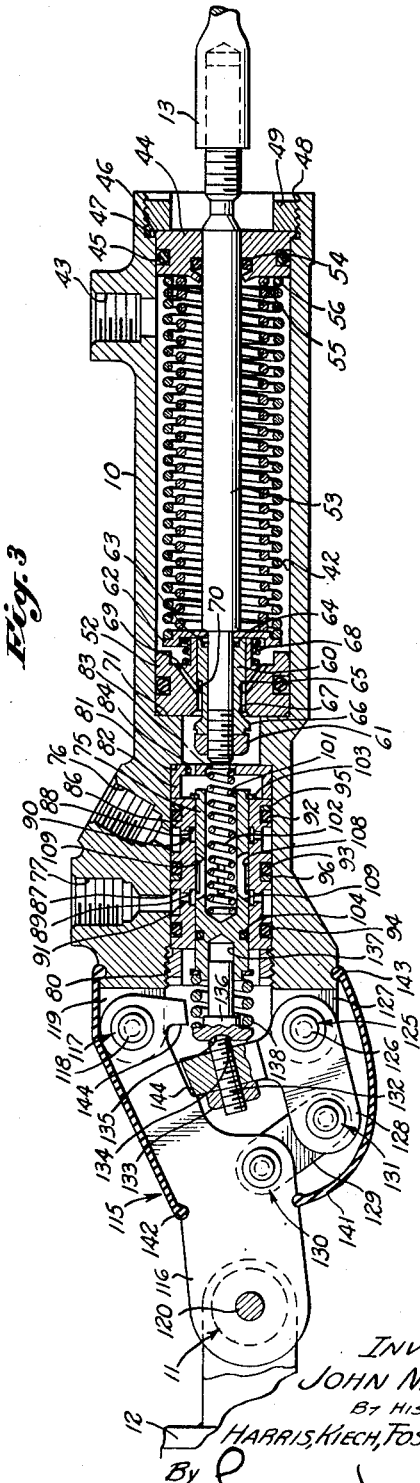
INVENTOR:
JOHN N. GLADDEN
BY HIS ATTORNEYS
HARRIS, KIECH, FOSTER & HARRIS Patented Apr. 27, 1954

2,676,465

UNITED STATES PATENT OFFICE 2,676,465

HYDRAULIC BOOSTER WITH FLOATING MOUNTING

John N. Gladden, Glendale, Calif.

Application June 24, 1950, Serial No. 170,155

6 Claims. (Cl. 60—54.6)

The invention to be disclosed herein relates to hydraulic boosters and, more particularly, to hydraulic boosters of the type which merely adds to the applied force a boosting force which varies with the applied force so that the operator of the booster is always provided with the proper feel, a primary object of the invention being to provide an improved device of this character.

The hydraulic booster of the invention finds particular utility when employed to actuate the hydraulic braking systems of airplanes, or other vehicles, and will be considered in such connection hereinafter as a matter of convenience, although it will be understood that my hydraulic booster may be employed in various other hydraulically operated systems.

In general, the invention contemplates a hydraulic booster which includes a housing having therein a cylinder for a piston adapted to be moved axially of the cylinder by an axial operating force applied thereto to deliver operating fluid through an operating port to a hydraulic braking system, or the like, and which includes a valve for applying to the piston a boosting fluid pressure varying with the operating force applied to the piston, an important object of the invention being to provide such a hydraulic booster which includes means for actuating the valve without any necessity for mechanical connection between the valve and the means for applying the operating force to the piston.

Another object is to provide a floating mounting for the housing of the hydraulic booster which includes an actuating element pivotally connecting the housing to a support in such a manner that relative rotation between the actuating element and the housing occurs upon application of an axial operating force to the piston, the actuating element being operatively connected to the valve in such a manner that relative rotation between the actuating element and the housing as a result of the application of the axial operating force to the piston moves the valve to vary the boosting fluid pressure applied to the piston with variations in the axial operating force applied to the piston.

More particularly, an object of the invention is to provide such a hydraulic booster wherein the actuating element is pivotally connected to the housing and is adapted to be pivotally connected to a support for the hydraulic booster, at least one such pivotal connection, and preferably the pivotal connection between the actuating element and the housing, being offset laterally from the axis of the cylinder so that an axial operating force applied to the piston results in relative pivotal movement of the actuating element and the housing to move the valve in the manner hereinbefore described.

An important object of the invention is to provide such a hydraulic booster wherein the means operatively connecting the actuating element to the valve includes a series of pivoted elements connected to the actuating element and operatively engaging the valve.

A further object is to provide such a hydraulic booster wherein the valve is a selector valve adapted to connect the cylinder to an inlet or pressure port upon the application of an axial operating force to the piston, and adapted to connect the cylinder to an outlet or return port upon relaxation of the axial operating force, such connections between the cylinder and the inlet and outlet port being, of course, made on that side of the piston which is opposite the operating port in the cylinder.

Another important object of the invention is to provide such a booster wherein the selector valve is axially aligned with and is movable along the axis of the cylinder. This construction permits all of the movable elements of the hydraulic booster, with the exception of the elements of the actuating means for the selector valve, to be disposed in a series of axially aligned bores in the housing, which is an important feature.

The foregoing objects and advantages of the present invention, together with various other objects and advantages thereof which will become apparent, may be attained with the exemplary embodiment of the invention which is illustrated in the accompanying drawings and which is described in detail hereinafter. Referring to the drawings:

Fig. 2 is a longitudinal sectional view of the hydraulic booster of the invention showing the components of the booster in the positions which they assume when the booster is in operation;

Figure 4:
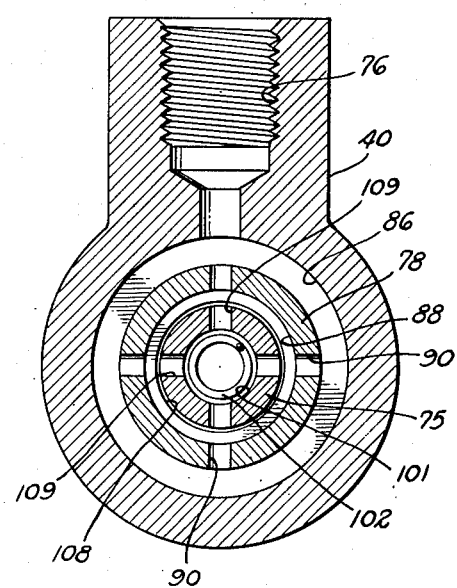
Figure 5:
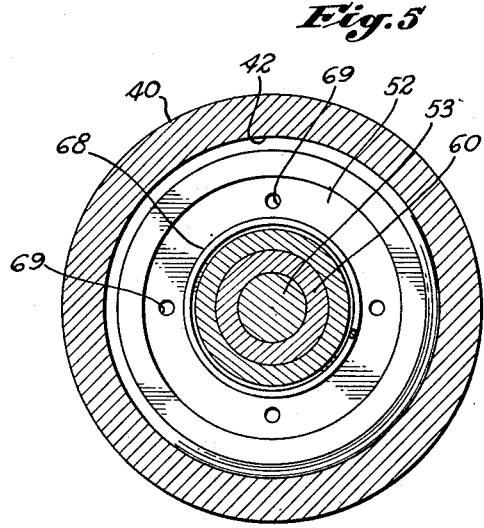

Fig. 3 is a view which duplicates Fig. 2, except that the various components of the booster are shown in the positions which they assume when the booster is not in operation; and Figs. 4 and 5 are transverse sectional views respectively taken along the broken lines 4—4 and 5—5 of Fig. 2.

Figure 1:
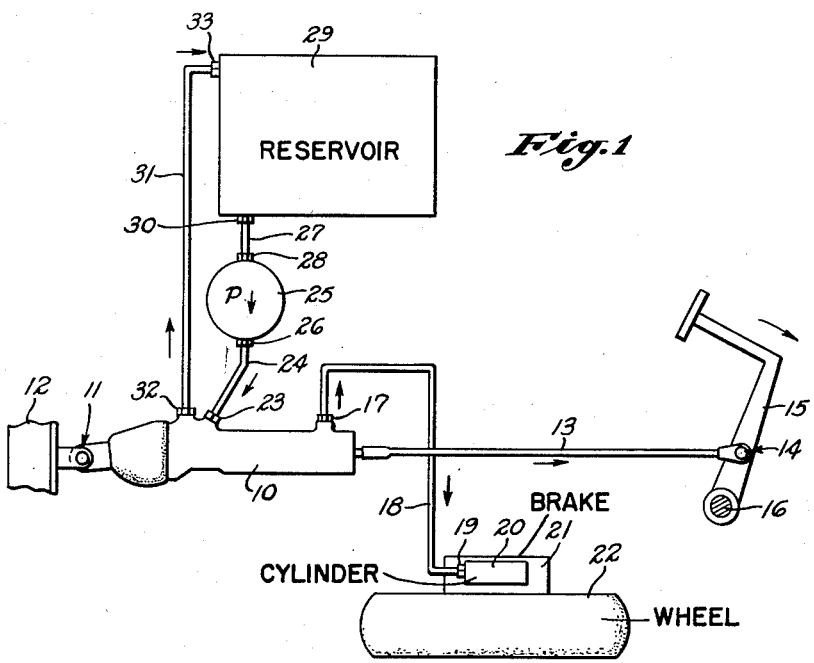
Fig. 1 is a diagrammatic view of a hydraulic braking system incorporating the hydraulic booster of the invention.

Referring particularly to Fig. 1, the numeral 10 designates the hydraulic booster of the invention, the booster being pivotally connected at point 11 at one end thereof to a support 12 which may be a portion of the frame of a vehicle such as an airplane, for example. Connected to the opposite end of the booster 10 is a brake rod 13 which is pivotally connected at 14 to a brake pedal 15, the latter being mounted on a shaft 16 in the usual manner. Connected to the booster 10 by a fitting 17 is an operating line 18 which is connected by means of a fitting 19 to a wheel cylinder 20 for actuating a brake 21 associated with a wheel 22. Connected to the booster 10 by a fitting 23 is an inlet or pressure line 24 which is connected to the discharge side of a pump 25 by a fitting 26. The intake side of the pump 25 is connected to an intake line 27 by a fitting 28, the intake line also being connected to a reservoir 29 by a fitting 30. The booster 10 is also connected to the reservoir 29 by an outlet or return line 31, the outlet line being connected to the booster by a fitting 32 and to the reservoir by a fitting 33. The pump 25 preferably delivers boosting fluid from the reservoir 29 to the booster 10 at a constant pressure.

Considering the general operation of the hydraulic braking system illustrated in Fig. 1, a braking force applied to the brake pedal 15 results in the application of an axial pull force to the booster 10 to deliver an operating fluid under pressure to the wheel cylinder 20 through the operating line 18. As will be described in more detail hereinafter, the axial pull force applied to the booster 10 through the brake rod 13 results in the delivery of boosting fluid under pressure to the booster 10 by the pump 25 to amplify the operating fluid pressure applied to the wheel cylinder 20. Relaxation of the braking force applied to the brake pedal 15 results in connecting the booster 10 to the reservoir 29 through the outlet line 31 to relieve the boosting fluid pressure applied to the booster 10 so as to relax the operating fluid pressure applied to the wheel cylinder 20 and thus render the brake 21 inoperative. With the foregoing general description of the operation of the booster 10 in mind, the details of the structure and operation thereof will now be considered.

Referring particularly to Figs. 2 and 3, the hydraulic booster 10 includes an elongate housing 40 having a longitudinal bore 41 therethrough, the housing being counterbored adjacent one end thereof to provide a cylinder 42 having an operating port 43 adjacent its outer end. The operating port 43 is preferably internally threaded to receive the fitting 17 for the operating line 18. The outer end of the cylinder 42 is closed by a plug 44 which is sealed with respect to the wall of the cylinder by an O-ring 45 and which is provided with an annular flange 46 adapted to seat on a shoulder 47 formed at the junction of the outer end of the cylinder 42 with a counterbore 48 in the housing 40. The plug 44 is retained by an annular nut 49 threaded into the counterbore 48. Reciprocable in the cylinder 42 is a piston 52 having connected thereto a piston rod 53 which projects axially from the outer end of the cylinder 42 through a central bore in the plug 44, the piston rod being sealed with respect to the plug by an O-ring 54. The projecting end of the piston rod 53 is threaded or otherwise adapted for connection to the brake rod 13, or other means for applying an axial operating force to the piston rod. As will be apparent, application of an axial pull force to the piston rod 53 results in displacement of operating fluid under pressure from the cylinder 42 outwardly through the operating port 43 and into the operating line 18 leading to the wheel cylinder 20, or other device to be operated. The piston 52 is biased toward the inner end of the cylinder 42 by compression springs 55 and 56 which act to return the piston to the inner end of the cylinder 42 upon relaxation or termination of the axial pull force applied to the piston rod 53, thereby relieving the operating fluid pressure applied to the wheel cylinder 20, or other device to be operated.

The piston 52 incorporates a valve 60 which closes upon application of an axial pull force to the piston rod 53, as illustrated in Fig. 2. The valve 60 is mounted on a reduced-diameter portion of the piston rod 53 and is retained thereon by a nut 61, a spring seat 62 for the piston-biasing springs 55 and 56 being clamped between the valve 60 and a shoulder 63 on the piston rod. The valve 60 is sealed with respect to the piston rod by packing 64. The valve 60 is reciprocable in a bore 65 through the piston 52 and is provided with a conical surface 66 which is adapted to engage a complementary seat 67 at one end of the bore 65 through the piston. The piston 52 is biased toward the conical surface 66 on the valve 60 to maintain the conical seat 67 therein in engagement with such conical surface by a compression spring 68 seated at one end against the piston and at its other end against the spring seat 62. As best shown in Figs. 2, 3 and 5, the piston is provided with passages 69 therethrough which provide fluid communication between the cylinder 42 on the operating-port side of the piston and an annular groove 70 in the valve 60 on the operating-port side of the conical seat 67. As shown in Fig. 3, when the piston 52 is at the inner end of the cylinder 42 and is seated against a shoulder 71 at the junction of the cylinder 42 with the bore 41, the springs 55 and 56 overcome the spring 68 to open the valve 60 so as to equalize the pressures on opposite sides of the piston. In all other positions, the valve 60 is closed by the pressure on the operating-port side of the piston and by the compression spring 68.

The booster 10 includes a selector valve 75 for connecting an inlet or pressure port 76 to the inner end of the cylinder 42 in response to the application of an axial pull force to the piston rod 53 and for connecting an outlet or return port 77 to the inner end of the cylinder upon termination of such axial pull force, the inlet port being adapted to be connected to the pump 25 so that a boosting fluid pressure is applied to the piston 52 to amplify the axial pull force applied to the piston rod, and the outlet port being adapted to be connected to the reservoir 29 so as to relieve the boosting fluid pressure applied to the piston upon termination of the axial pull force applied to the position rod. Preferably, the inlet and outlet ports 76 and 77 are internally threaded to receive the fittings 23 and 32 for the inlet and outlet lines 24 and 31. The selector valve 75 is reciprocable in a bushing 78 which is disposed in a counterbore 79 concentric with the bore 41 and which is retained in the counterbore by an annular nut 80 threaded thereinto. Clamped between the bushing 78 and a shoulder 81 at the junction of the counterbore 79 with the bore 41 is a cup-shaped element 82 having a central port 83 and a radially offset port 84 therethrough which provide fluid communication with the inner end of the cylinder 42. The bushing 78 is provided with external annular inlet and outlet grooves 86 and 87 therein which register with the inlet and outlet ports 76 and 77, respectively, and is provided with internal annular inlet and outlet grooves 88 and 89 therein which communicate with the external inlet and outlet grooves 86 and 87, respectively, through ports 90 and 91, respectively, as best shown in Figs. 2, 3 and 4. The bushing 78 is sealed with respect to the wall of the counterbore 79 in which it is disposed by O-rings 92, 93 and 94, the O-rings 92 and 93 being disposed on opposite sides of the external inlet groove 86 and the O-rings 93 and 94 being disposed on opposite sides of the external outlet groove 87. The O-rings 92 and 93 on opposite sides of the external inlet groove 86 are reinforced by backing rings 95 and 96, respectively.

The selector valve 75 is of the piston type and is provided with an axial bore 101 therein. Disposed in the bore 101 is a compression spring 102 for biasing the selector valve toward a position which is shown in Fig. 3 and which is hereinafter termed the "outlet position" of the selector valve, the spring 102 being seated at one end against the bottom of the bore 101 and at its other end against the cup-shaped element 82. Movement of the selector valve to the left, as viewed in the drawings, beyond its outlet position is prevented by a snap ring 103 carried by the valve and adapted to engage the bushing 78. A fluid-tight seal tending to prevent leakage between the selector valve 75 and the bushing 78 toward the left, as viewed in the drawings, is provided by an O-ring 104.

The selector valve is provided with a shallow, external annular groove 108 therein which is adapted to register with one or the other, but not both, of the internal inlet and outlet grooves 88 and 89 in the bushing 78, the groove 108 in the valve communicating with the bore 101 therein through slots 109 in the valve, as best shown in Figs. 2, 3 and 4. When the selector valve 75 is in its outlet position, as shown in Fig. 3, the groove 108 and slots 109 communicate with the internal outlet groove 89 in the bushing 78, and when the selector valve is in the position shown in Fig. 2, hereinafter termed the "inlet position" of the selector valve, the groove 108 and the slots 109 communicate with the inlet groove 88. Thus, when the selector valve 75 is in its inlet position, as shown in Fig. 2, it connects the pump 25 to the inner end of the cylinder 42 to apply a boosting fluid pressure to the piston 52, and when the selector valve is in its outlet position, as shown in Fig. 3, it connects the inner end of the cylinder 42 to the reservoir 29 to eliminate the boosting fluid pressure.

The hydraulic booster 10 of the invention includes actuating means 115 for moving the selector valve 75 from its outlet position to its inlet position in response to the application of an axial pull force to the piston rod 53, and for moving the selector valve 75 from its inlet position to its outlet position upon termination of such an axial pull force. The actuating means 115 includes an actuating element 116 which is pivotally connected to the housing 40 at 117, as by a pivot pin 118 extending between a pair of ears 119 on the housing, only one of the ears 119 being visible in the drawings. The other end of the actuating element 116 is adapted to be pivotally connected at 11 to a support, such as the support 12, as by a pivot pin 120. At least one of the points of pivotal connection 11 and 117 of the actuating element 116 is offset laterally relative to the axis of the cylinder 42. Preferably, the point of pivotal connection 117 to the housing 40 is laterally offset with respect to such axis, the point of pivotal connection 11 to the support 12 being approximately aligned with such axis, as shown in Fig. 3. Upon application of an axial pull force to the piston rod 53, the axis of the cylinder 42 aligns itself with the pivotal connection 11 to the support 12 and the point of pivotal connection 117 to the housing 40 tends to align itself with the axis of the cylinder, the result being that relative rotation of the actuating element 116 and the housing occurs, as will be apparent by comparing Figs. 2 and 3. Such relative rotation of the actuating element 116 and the housing 40 resulting from the application of an axial pull force to the piston rod 53 is employed to move the selector valve 75 from its outlet position to its inlet position, as will now be described.

Pivotally connected to the housing 40 at 125, as by a pin 126 extending between ears 127 on the housing, is a bell crank 128. One arm of the bell crank 128 is pivotally connected to the actuating element 116 intermediate the points of pivotal connection 11 and 117 thereof to the support 12 and housing 40 by a link 129, the latter being pivotally connected to the actuating element at 130 and to the bell crank at 131. The other arm of the bell crank 128 carries a constant pin 132 which is threaded through such arm of the bell crank and which is retained by a lock nut 133, the contact pin 132 thus being adjustable relative to the bell crank 128. The contact pin 132 is provided with an approximately semi-spherical end 134 which is seated in a complementary recess 135 in the head of an actuating pin 136, the stem of the latter extending into an axial bore 137 in the selector valve 75. The head of the actuating pin 136 is maintained in engagement with the contact pin 132 by a compression spring 138 which is seated at one end against the head on the actuating pin and at its other end against a washer seated against an annular shoulder on the selector valve. A flexible boot 141 having beads 142 and 143 respectively disposed in annular grooves in the actuating element 116 and the housing 40 serves as a dust seal.

In operation, the operator of the vehicle in which the hydraulic braking system illustrated in Fig. 1 is incorporated applies a braking force to the brake pedal 15 to apply an axial pull force to the piston rod 53, thereby moving the piston 52 toward the operating port 43 to discharge operating fluid under pressure through the operating port and into the operating line 18 leading to the wheel cylinder 20 so as to operate the brake 21 associated with the wheel 22. As soon as the axial pull force applied to the piston rod 53 attains sufficient magnitude, the actuating element 116 is rotated relative to the housing 40 sufficiently to begin to move the selector valve 75 from its outlet position toward its inlet position. A further increase in the magnitude of the axial pull force applied to the piston rod results in sufficient axial movement of the selector valve 75 toward its inlet position to initiate communication between the internal inlet groove 88 in the bushing 78 and the external groove 108 and slots 109 in the selector valve, whereupon boosting fluid under pressure supplied by the pump 25 is delivered to the inner end of the cylinder 42 to assist the operator in applying the brake 21. As will be apparent, the extent to which the groove 108 and slots 109 in the selector valve 75 register with the internal inlet groove 88 in the bushing 78 is determined by the magnitude of the axial pull force applied to the piston rod 53. Thus, the amount of boost obtained is a function of the braking force applied to the brake pedal by the operator so that the necessary feel is provided to the operator. If desired, the selector valve 75 may be adjusted to initiate delivery of boosting fluid under pressure to the inner end of the cylinder 42 only in cases where the operating fluid pressure to be applied to the wheel cylinder 20 is of such magnitude as to require an excessive braking force on the part of the operator. Alternatively, the selector valve may be adjusted to provide a boosting effect upon the application of only a very small braking force to the brake pedal 15. As will be apparent, such adjustments may be made by means of the adjustable contact pin 132. Threading the contact pin 132 inwardly will advance initiation of the boosting action, while threading it outwardly will delay initiation thereof.

As soon as the braking force applied to the brake pedal 15 by the operator is released, the springs 55 and 56 return the piston 52 to the inner end of the cylinder 42 and the spring 102 returns the selector valve 75 to its outlet position to permit displacement of fluid from the inner end of the cylinder 42 back to the reservoir 29.

As previously pointed out, when the selector valve is in its outlet position, the supply of boosting fluid from the pump 25 is cut off. When the piston 52 reaches the inner end of the cylinder 42 and engages the shoulder 71, the springs 55 and 56 open the valve 60 to equalize the pressures on opposite sides of the piston so as to insure that no residual pressure will be applied to the wheel cylinder 20.

As previously pointed out, the snap ring 103 carried by the selector valve 75 limits movement of the selector valve beyond its outlet position under the influence of the spring 102. Movement of the selector valve beyond its inlet position in response to the application of an axial pull force to the piston rod 53 is limited by engagement of the selector valve with the cup-shaped element 82, as shown in Fig. 2. Movement of the bell crank 128 is limited by engagement of that arm thereof which carries the contact pin 132 with shoulders 144 on the actuating element 116.

Although I have disclosed an exemplary embodiment and an exemplary application of my invention herein for purposes of illustration, it will be understood that the invention is susceptible of other applications and other embodiments.

I claim as my invention:

1. In a hydraulic booster, the combination of: a housing having a cylinder and having an operating port for an operating fluid and inlet and outlet ports for a boosting fluid, said operating port communicating with said cylinder at one end of said cylinder, and said inlet and outlet ports being adapted to communicate with said cylinder at the other end of said cylinder; a piston reciprocable in said cylinder; a piston rod connected to said piston and projecting axially from said cylinder, said piston rod being adapted to have an axial force applied thereto to move said piston toward said one end of said cylinder; a selector valve in said housing and movable between an inlet position wherein it connects said inlet port in fluid communication with said other end of said cylinder and an outlet position wherein it connects said outlet port in fluid communication with said other end of said cylinder, said selector valve being aligned with said cylinder and being movable along the axis thereof; an actuating element for said selector valve pivotally connected to said housing at a first pivot point and adapted to be pivotally supported at a second pivot point, at least one of said pivot points being offset laterally from the axis of said cylinder so that application of an axial force to said piston rod results in relative rotation of said actuating element and said housing about said first pivot point; and adjustable connecting means operatively connecting said actuating element and said selector valve and responsive to the rotation of said actuating element relative to said housing about said first pivot point which results from the application of an axial force to said piston rod for moving said selector valve from its outlet position to its inlet position to connect said inlet port in fluid communication with said other end of said cylinder.

2. In a hydraulic booster, the combination of: an elongate housing having a longitudinal cylinder at one end thereof, said housing having an operating port for an operating fluid, said operating port communicating with said cylinder at one end of said cylinder, and said housing having inlet and outlet ports for a boosting fluid, said inlet and outlet ports being adapted to communicate with said cylinder at the other end of said cylinder; a piston reciprocable in said cylinder; a piston rod connected to said piston and projecting axially from said cylinder, said piston rod being adapted to have an axial force applied thereto to move said piston toward said one end of said cylinder; a selector valve in said housing and movable between an inlet position wherein it connects said inlet port in fluid communication with said other end of said cylinder and an outlet position wherein it connects said outlet port in fluid communication with said other end of said cylinder, said selector valve being aligned with said cylinder and being movable along the axis thereof; an actuating element for said selector valve pivotally connected to said housing at a first pivot point adjacent the other end of said housing, said actuating element being adapted to be pivotally supported at a second pivot point, at least one of said pivot points being offset laterally from the axis of said cylinder so that application of an axial force to said piston rod results in relative rotation of said actuating element and said housing about said first pivot point; and adjustable connecting means operatively connecting said actuating element and said selector valve and responsive to the rotation of said actuating element relative to said housing about said first pivot point which results from the application of an axial force to said piston rod for moving said selector valve from its outlet position to its inlet position to connect said inlet port in fluid communication with said other end of said cylinder.

3. In a hydraulic booster, the combination of: an elongate housing having a longitudinal cylinder at one end thereof, said housing having an operating port for an operating fluid at said one end of said housing, said operating port communicating with said cylinder at one end of said cylinder, and said housing having inlet and outlet ports for a boosting fluid adjacent the other end of said housing, said inlet and outlet ports being adapted to communicate with said cylinder at the other end of said cylinder; a piston reciprocable in said cylinder; a piston rod connected to said piston and projecting axially from said one end of said cylinder, said piston rod being adapted to have an axial pull force applied thereto to move said piston toward said one end of said cylinder; a selector valve in said housing adjacent said other end of said housing and movable between an inlet position wherein it connects said inlet port in fluid communication with said other end of said cylinder and an outlet position wherein it connects said outlet port in fluid communication with said other end of said cylinder; an actuating element for said selector valve pivotally connected to said housing at a first pivot point which is adjacent said other end of said housing and which is offset laterally from the axis of said cylinder, said actuating element being adapted to be pivotally supported at a second pivot point which is approximately aligned with the axis of said cylinder, whereby application of an axial pull force to said piston rod results in relative rotation of said housing and said actuating element about said first pivot point to decrease the lateral offset of said first pivot point from the axis of said cylinder; and adjustable connecting means pivotally connected to said actuating element and responsive to the rotation of said actuating element relative to said housing about said first pivot point which results from the application of an axial pull force to said piston rod for moving said selector valve from its outlet position to its inlet position so as to connect said inlet port in fluid communication with said other end of said cylinder.

4. A hydraulic booster as defined in claim 3 wherein said selector valve is aligned with said cylinder and is movable along the axis thereof.

5. In a hydraulic booster, the combination of: an elongate housing having a longitudinal cylinder at one end thereof, said housing having an operating port for an operating fluid at said one end of said housing, said operating port communicating with said cylinder at one end of said cylinder, and said housing having inlet and outlet ports for a boosting fluid adjacent the other end of said housing, said inlet and outlet ports being adapted to communicate with said cylinder at the other end of said cylinder; a piston reciprocable in said cylinder; a piston rod connected to said piston and projecting axially from said one end of said cylinder, said piston rod being adapted to have an axial pull force applied thereto to move said piston toward said one end of said cylinder; a selector valve in said housing adjacent said other end of said housing and movable between an inlet position wherein it connects said inlet port in fluid communication with said other end of said cylinder and an outlet position wherein it connects said outlet port in fluid communication with said other end of said cylinder; an actuating element for said selector valve pivotally connected to said housing at a first pivot point which is adjacent said other end of said housing and which is offset laterally from the axis of said cylinder, said actuating element being adapted to be pivotally supported at a second pivot point which is approximately aligned with the axis of said cylinder, whereby application of an axial pull force to said piston rod results in relative rotation of said housing and said actuating element about said first pivot point to decrease the lateral offset of said first pivot point from the axis of said cylinder; and means pivotally connected to said actuating element and responsive to the rotation of said actuating element relative to said housing about said first pivot point which results from the application of an axial pull force to said piston rod for moving said selector valve from its outlet position to its inlet position so as to connect said inlet port in fluid communication with said other end of said cylinder, including a bell crank one arm of which is operatively connected to said selector valve, and including a link pivotally connected to the other arm of said bell crank and to said actuating element.

6. In a hydraulic booster, the combination of: a housing having a cylinder and having an operating port for an operating fluid and inlet and outlet ports for a boosting fluid, said operating port communicating with said cylinder at one end of said cylinder, and said inlet and outlet ports being adapted to communicate with said cylinder at the other end of said cylinder; a piston reciprocable in said cylinder; a piston rod connected to said piston and projecting axially from said cylinder, said piston rod being adapted to have an axial force applied thereto to move said piston toward said one end of said cylinder; a selector valve in said housing and movable between an inlet position wherein it connects said inlet portion fluid communication with said other end of said cylinder and an outlet position wherein it connects said outlet port in fluid communication with said other end of said cylinder; an actuating element for said selector valve pivotally connected to said housing at a first pivot point and adapted to be pivotally supported at a second pivot point, at least one of said pivot points being offset laterally from the axis of said cylinder so that application of an axial force to said piston rod results in relative rotation of said actuating element and said housing about said first pivot point; and adjustable connecting means operatively connecting said actuating element and said selector valve, and responsive to the rotation of said actuating element relative to said housing about said first pivot point resulting from the application of an axial force to said piston rod, for moving said selector valve from its outlet position to its inlet position to connect said inlet port in fluid communication with said other end of sad cylinder.

References Cited in the file of this patent

UNITED STATES PATENTS

| Number | Name | Date |
|---|---|---|
| 2,208,282 | Shelor | July 16, 1940 |
| 2,343,698 | Parnell | Mar. 7, 1944 |
| 2,524,012 | Groebe | Sept. 26, 1950 |